United States Patent [19]

Schwertfeger et al.

[11] Patent Number: 5,587,107
[45] Date of Patent: Dec. 24, 1996

[54] SIO₂ AEROGELS CONTAINING CARBON PARTICLES AND THEIR PREPARATION

[75] Inventors: Fritz Schwertfeger; Ulrich Schubert; Elisabeth Seyfried; Joachim Kuhn; Jochen Fricke, all of Wuerzburg; Manfred Mielke, Heidelberg, all of Germany

[73] Assignee: BASF Aktiengesellschaft, Ludwigshafen, Germany

[21] Appl. No.: 179,698

[22] Filed: Jan. 11, 1994

[30] Foreign Application Priority Data

Jan. 13, 1993 [DE] Germany .......... 43 00 598.5

[51] Int. Cl.⁶ .................. B01J 13/00; E04B 1/76
[52] U.S. Cl. .......... 252/315.6; 252/62; 252/315.2; 252/587; 501/12
[58] Field of Search .................. 252/62, 315.2, 252/315.6, 583, 587; 427/255.1; 428/404; 501/12; 502/413

[56] References Cited

U.S. PATENT DOCUMENTS

| | | | |
|---|---|---|---|
| 2,188,007 | 1/1940 | Kistler | 252/62 |
| 2,945,817 | 7/1960 | Goldblum | 252/62 X |
| 4,058,483 | 11/1977 | Henbest | 502/413 |
| 4,155,772 | 5/1979 | Birchall et al. | 428/404 X |
| 4,221,672 | 9/1980 | McWilliams | 252/62 |
| 4,263,268 | 4/1981 | Knox et al. | 423/449 |
| 4,432,956 | 2/1984 | Zarzycki et al. | 423/338 |
| 4,447,345 | 5/1984 | Kummermehr et al. | 252/62 |
| 4,472,510 | 9/1984 | January | 501/12 |
| 4,667,417 | 5/1987 | Graser et al. | 34/337 |
| 5,275,796 | 1/1994 | Tillotson et al. | 423/338 |

FOREIGN PATENT DOCUMENTS 3525802  1/1987  Germany .

OTHER PUBLICATIONS

*Derwent Publications Ltd.*, Week 9209, AN 92–068677 (English abstract of JP-A 4012014). (1992).

*Primary Examiner*—Richard D. Lovering
*Attorney, Agent, or Firm*—Keil & Weinkauf

[57] ABSTRACT

SiO₂ aerogels containing carbon particles are obtainable by heating a) organically modified SiO₂ aerogels in the presence of at least one pyrolyzable hydrocarbon gas and/or at least one inert gas or b) organically unmodified SiO₂ aerogels in the presence of at least one pyrolyzable hydrocarbon gas and in the presence or absence of inert gases to 600°–1300° C.

6 Claims, No Drawings

SIO₂ AEROGELS CONTAINING CARBON PARTICLES AND THEIR PREPARATION

The present invention relates to SiO$_2$ aerogels containing carbon particles and processes for their preparation, in particular to SiO$_2$ aerogels which contain carbon particles and are obtainable by thermal after-treatment of unmodified or organically modified SiO$_2$ aerogels in a specific gas atmosphere.

In order to achieve optimum heat insulation properties of SiO$_2$ aerogels, the latter must have a high specific absorbance in the infrared range. For this purpose, finely divided carbon blacks (predominantly crystalline carbon) are, as a rule, introduced into the SiO$_2$ aerogels by adding carbon black during the sol/gel process or by physical admixing of carbon black with SiO$_2$ aerogel powders.

However, agglomeration of the carbon black particles frequently occurs in this procedure, so that both the homogeneous distribution thereof in the aerogel and the particle size required for optimum absorbance are not ensured. The desired specific absorbance in the infrared range can therefore be obtained only to a very limited extent.

Moreover, the addition of carbon black results in soiling of the production plant in important parts so that every changeover to the production of non-opacified, transparent SiO$_2$ aerogel entails very expensive cleaning.

It is an object of the present invention to provide SiO$_2$ aerogels which contain carbon particles and no longer have these disadvantages.

We have found that this object is achieved, surprisingly, by SiO$_2$ aerogels which contain carbon particles and are obtainable by a specific thermal treatment of unmodified or organically modified SiO$_2$ aerogels.

The present invention therefore relates to SiO$_2$ aerogels containing carbon particles and obtainable by heating a) organically modified SiO$_2$ aerogels in the presence of at least one pyrolyzable hydrocarbon gas and/or at least one inert gas or b) organically unmodified SiO$_2$ aerogels in the presence of at least one pyrolyzable hydrocarbon gas and in the presence or absence of inert gases to 600°–1300° C.

The present invention also relates to SiO$_2$ aerogels containing carbon particles, having a density of less than 250 kg/m$^3$ and obtainable by heating a) organically modified SiO$_2$ aerogels having a density of less than 250 kg/m$^3$ in the presence of at least one pyrolyzable hydrocarbon gas and/or at least one inert gas or b) organically unmodified SiO$_2$ aerogels having a density of less than 250 kg/m$^3$ in the presence of at least one pyrolyzable hydrocarbon gas and in the presence or absence of inert gases to 350°–700° C.

The present invention furthermore relates to a process for the production of carbon particles in SiO$_2$ aerogels, wherein a) organically modified SiO$_2$ aerogels are heated in the presence of at least one pyrolyzable hydrocarbon gas and/or at least one inert gas or b) organically unmodified SiO$_2$ aerogels are heated in the presence of at least one pyrolyzable hydrocarbon gas and in the presence or absence of inert gases to 600°–1300° C.

The present invention furthermore relates to a process for the production of carbon particles in SiO$_2$ aerogels having a density of less than 250 kg/m$^3$, which comprises heating to 350°–700° C.

a) organically modified SiO$_2$ aerogels having a density of less than 250 kg/m$^3$ in the presence of at least one pyrolyzable hydrocarbon gas and/or at least one inert gas or b) organically unmodified SiO$_2$ aerogels having a density of less than 250 kg/m$^3$ in the presence of at least one pyrolyzable hydrocarbon gas and in the presence or absence of inert gases.

The novel process is also referred to below as pyrolysis.

The organically modified SiO$_2$ aerogels used according to the invention generally contain organic radicals R directly bonded to silicon atoms or bonded via oxygen atoms. Preferred organically modified SiO$_2$ aerogels contain at least some organic radicals R bonded directly to silicon atoms.

Examples of suitable organic radicals R are alkyl, alkenyl, alkynyl and aryl. The organic radical is preferably alkyl or aryl. Particularly preferred alkyl radicals are methyl and propyl. A preferably used aryl radical is phenyl.

For the purposes of the present invention, organically modified SiO$_2$ aerogels include the SiO$_2$ aerogels already containing carbon particles, as can be obtained by heating a) organically modified SiO$_2$ aerogels in the presence of at least one pyrolyzable hydrocarbon gas and/or at least one inert gas or b) organically unmodified SiO$_2$ aerogels in the presence of at least one pyrolyzable hydrocarbon gas and in the presence or absence of inert gases to 600°–1300° C.

Organically modified SiO$_2$ aerogels can be prepared, for example, in a known manner via the sol-gel process using organo(trimethoxy)silanes RSi(OMe)$_3$ having nonhydrolyzable organic radicals R. For MeSi(OMe)$_3$, this is already described in Hydrophobic Aerogels from Si(OMe)$_4$/MeSi(OMe)$_3$ Mixtures by F. Schwertfeger, W. Glaubitt and V. Schubert, published in Journal of Non-Crystalline Solids, 145 (1992), 85–89.

Organo-substituted alkogels can be obtained by base-catalyzed hydrolysis and condensation, for example of mixtures of tetramethoxysilane, Si(OMe)$_4$, and organo(trimethoxy)silanes, RSi(OMe)$_3$, and the corresponding SiO$_2$ aerogels can be obtained therefrom by subsequent supercritical drying, for example with methanol:

x RSi(OMe)$_3$ + y Si(OMe)$_4$ + (3x + 4y) H$_2$O +

$$z \text{ MeOH} \xrightarrow{\text{Aqueous 0.01 N ammonia solution}}$$

$$[\text{RSiO}_{3/2}]_x[\text{SiO}_2]_y \xrightarrow[\text{with methanol}]{\text{Supercritical drying}} \text{SiO}_2 \text{ aerogel of the same composition}$$
(Alkogel)

For example, RSi(OR')$_3$ (R=alkyl, alkenyl, alkynyl or aryl, preferably methyl, propyl or phenyl) and Si(OR')$_4$ (R'=alkyl or aryl, preferably methyl or ethyl) are mixed in various ratios (x mol of RSi(OR')$_3$ and y mol of Si(OR')$_4$). Any ratio of x to y is possible, but the ratio is preferably from 0:1 to 2:3 for achieving the desired combination of properties. To obtain a predetermined density of the SiO$_2$ aerogel, the alkoxysilanes are dissolved in a specific amount of particular alcohols R'OH. The relationship between the desired density d and the amount of solvent V required for this purpose (V$_{MeOH}$ in the case of methanol) is:

$$d = \frac{[x \cdot {}^M\text{RSiO}_{3/2} + y \cdot {}^M\text{SiO}_2]}{{}^V\text{Si(OR')}_4 + {}^V\text{RSi(OR')}_3 + {}^V\text{H}_2\text{O} + {}^V\text{MeOH}}$$

where $^M$RSiO$_{3/2}$ and $^M$SiO$_2$ are the molecular weights of the oxidic components obtained from RSi(OR')$_3$ and Si(OR')$_4$, respectively.

In an embodiment of the novel process, (3x+4y) mol of water, in the form of an aqueous 0.01 N ammonia solution, is added to the solution.

After mixing, the batch is allowed to stand in a closed vessel at from 10° to 60° C. preferably from 20° to 30° C., until gelling occurs.

After the gel point has been reached, the gels are generally aged by storage in a closed vessel for from 2 to 20 days at from 10° to 60° C., preferably for from 5 to 10 days at from 20° to 30° C. The suitable aging period can be determined by continuously determining the $H_2O/R'OH$ ratio in the gels, this ratio no longer changing after the end of the aging processes.

After aging, the gels are subjected to super-critical drying in a conventional manner (cf. for example U.S. Pat. No. 4,667,417).

Here, a chemical reaction may occur between the solvents used for the supercritical drying (for example methanol) and the $SiO_2$ (aero)gel, so that, for example in the case of methanol, 0-methyl groups are formed.

Alternatively, it is possible to form organically modified $SiO_2$ aerogels in which the organic radicals R are bonded to silicon atoms exclusively via oxygen atoms, the starting materials used being organically unmodified $SiO_2$ aerogels which have been supercritically dried with the aid of suitable organic solvents (for example methanol, ethanol, propanol or isopropanol).

For the purposes of the present invention, organically unmodified $SiO_2$ aerogels are $SiO_2$ aerogels which have been prepared, for example, by means of a sol/gel process from aqueous sodium silicate and sulfuric acid, washing out the sodium salt, solvent exchange with, for example, carbon dioxide and supercritical drying.

In an embodiment of the invention, the $SiO_2$ aerogels containing carbon particles are obtained by a process in which organically unmodified $SiO_2$ aerogels, as can be prepared by supercritical drying according to DE-A-34 29 671, are heated in the presence of at least one pyrolyzable hydrocarbon gas and in the presence or absence of inert gases to 600°–1300° C.

For this purpose, the $SiO_2$ aerogels are generally kept in an atmosphere containing pyrolyzable hydrocarbon gases for a period of from 1 to 10, preferably from 3 to 5, hours at from 600° to 1300° C. preferably from 700° to 1200° C., particularly preferably from 900° to 1000° C. A gentle stream of the pyrolyzable hydrocarbon gas is preferably established. For example, a stream of from 10 to 500 $cm^3$/min is set in the case of from 10 to 100 $cm^3$ of aerogel.

For the purposes of the present invention, pyrolyzable hydrocarbon gases are preferably methane, propane or acetylene. A mixture, such as natural gas, may also be used. The pyrolyzable gas can, if required, be diluted with an inert gas, in particular nitrogen or argon.

According to the process described above, for example, $SiO_2$ aerogels containing carbon particles and having a carbon content of from 1 to 43% by weight are obtained starting from organically unmodified $SiO_2$ aerogels, in bead form (particle diameter from 2 to 6 mm) or in powder form (particle diameter from 0.1 to 0.3 mm) after thermal treatment for from 1 to 10 hours. Such $SiO_2$ aerogels containing carbon particles had a specific absorbance a (in $m^2$/kg) of 330 at 2.5 μm, 290 at 5.0 μm and 280 at 6 μm, for example with a carbon content of 16% by weight.

In a preferred embodiment of the invention, $SiO_2$ aerogels containing carbon particles are obtained by heating organically modified $SiO_2$ aerogels in the presence of at least one pyrolyzable hydrocarbon gas and/or at least one inert gas to 600°–1300° C.

For this purpose, the $SiO_2$ aerogels are kept, for example, at from 600° to 1300° C. in the atmosphere of a chemically inert gas. In a preferred variant of this embodiment, the $SiO_2$ aerogels are heated to 250°–500° C., preferably 350°–450° C., in a gentle stream of the inert gas at a heating rate of from 5 to 15, preferably from 8 to 10, ° C./min For example, a stream of from 10 to 100 $cm^3$/min is established in the case of from 10 to 100 $cm^3$ of aerogel.

Thereafter, the $SiO_2$ aerogels are further heated to 800°–1200° C. preferably 950°–1050° C. under a stationary inert gas atmosphere at a heating rate of from 0.2 to 10, preferably from 0.5 to 2, ° C./min.

Depending on the desired particle size of the carbon particles, ie. a specific IR absorbance, the $SiO_2$ aerogel samples are kept for up to a further 15 hours at from 800° to 1200° C. preferably for from 4 to 10 hours at from 900° to 1000° C.

$SiO_2$ aerogels containing carbon particles and having a density of less than 250, preferably less than 200 $kg/m^3$ are advantageously obtainable by heating a) organically modified $SiO_2$ aerogels having a density of less than 250, preferably less than 200, $kg/m^3$ in the presence of at least one pyrolyzable hydrocarbon gas and/or at least one inert gas or b) organically unmodified $SiO_2$ aerogels having a density of less than 250, preferably less than 200, $kg/m^3$ in the presence of at least one pyrolyzable hydrocarbon gas and in the presence or absence of inert gases to 400°–700° C. preferably 450°–600° C.

The novel process can be carried out in the conventional pyrolysis furnaces, for example quartz tubular furnaces.

The properties of the $SiO_2$ aerogels containing carbon particles can be varied within wide ranges, for example via the pyrolysis temperature. At from 750° to 950° C. for example where R is methyl, carbon particles are present in addition to undecomposed methyl groups and carbon-containing species having a C:H ratio of less than 3. With increasing temperature, the C:H ratio decreases At 1000° C. virtually no more hydrogen is present and the carbon is in elemental form.

During the pyrolysis, the volume of the $SiO_2$ aerogels changes slightly due to shrinkage. Furthermore, as a result of removal of organic components, the mass of the samples decreases. This results in a small change in the density of the samples.

However, the volume and density changes are as a rule in a range which is not critical for applications.

The specific surface area of the $SiO_2$ aerogels generally decreases during the pyrolysis (for example at 1000° C.). A holding time at 1000° C. beyond the time required for complete pyrolysis leads to a further reduction in the surface area. In order to obtain a very high specific surface area, the pyrolysis time should therefore be as short as possible. On the other hand, a longer pyrolysis time permits controlled reduction of the specific surface area, which is advantageous with regard to a reduction in the moisture absorption.

The STEM photographs taken of the pyrolyzed $SiO_2$ aerogels show essentially the same characteristic aerogel structure as the nonpyrolyzed starting materials. The size of the carbon particles homogeneously distributed in the aerogel sample is in the lower nanometer range. The aerogel structure is therefore not decisively influenced by the pyrolytic production of the carbon particles.

Raman measurements carried out on individual $SiO_2$ aerogels show that the carbon particles present have both crystalline and noncrystalline regions. The proportion of crystalline regions (carbon black) is highest in the case of the pyrolysis of phenyl-substituted $SiO_2$ aerogels. The holding time at 1000° C. has no influence on the proportion of crystalline carbon.

Investigations by means of IR spectroscopy show that the specific absorbance a in the wavelength range from 2.3 to 10 µm, for example for pyrolysis up to 1000° C., is from 10 to 100 $m^2/kg$, depending on the pyrolyzed organic group. At the same initial concentration of the organo-substituted alkoxysilane, the specific absorbance (after pyrolysis) increases for R=methyl<propyl <vinyl<<phenyl.

The specific absorbance can be substantially increased by a longer holding time. At 1000° C., for example, a can be increased to about 200 $m^2/kg$ at a wavelength of 2.3 µm.

If already pyrolyzed aerogels are reheated to 600°–1300° C. in the presence of a pyrolyzable gas, the specific absorbance a in the wavelength range from 2.3 to 10 µm can be increased to at least 800 $m^2/kg$.

In a particularly preferred embodiment of the invention, organically modified $SiO_2$ aerogels are therefore heated to 600°–1300° C. in the presence of at least one pyrolyzable hydrocarbon gas which can be diluted by inert gases.

The novel $SiO_2$ aerogels containing carbon particles and the novel process have many advantages.

The novel $SiO_2$ aerogels contain particularly homogeneously distributed unagglomerated carbon particles having sizes of a few nanometers.

The desired specific absorbance can be adjusted by optimization of the particle size and structure while specifying a specific pyrolysis time and temperature and, if required, by the choice of the corresponding organic radicals R.

Moreover, by further pyrolysis in the presence of pyrolyzable gases, it is possible in a controlled manner both to incorporate additional carbon particles into the $SiO_2$ aerogels and to increase the particle size, with the result that the specific absorbance values are further increased.

The fact that no substantial structural changes in the $SiO_2$ aerogels used occur as a result of the novel process is particularly advantageous.

Surprisingly, higher specific absorbance values are achieved with the same mass fraction of carbon.

The novel process also has the advantage that the reaction vessels used in the preparation of the aerogels and the autoclave system remain free of carbon black.

EXAMPLES 1 TO 9

Preparation of the organically modified $SiO_2$ aerogels 100 ml of organically modified $SiO_2$ aerogels in which the organic radical R on the Si atom was varied were in each case prepared according to the following general method. The radicals R used were methyl, vinyl, propyl and phenyl.

$RSi(OR')_3$ (R=methyl, vinyl, propyl, phenyl) and $Si(OR')_4$ (R'=methyl) were mixed in various ratios (x mol of $RSi(OR')_3$, y mol of $Si(OR')_4$) and dissolved in a specific amount of methanol (cf. Table 1).

A calculated amount of aqueous 0.01 N ammonia solution corresponding to (3x+4y) mol of water, was added to the solution. After mixing, the batch was allowed to stand in a closed vessel at room temperature until gelling occurred.

After the gel point had been reached, the gels were aged by storage in a closed vessel for 7 days at 30° C.

After the aging, the gels were subjected to supercritical drying with methanol as described in DE-A-18 11 353.

Table 1 shows the amounts used for the preparation and the reaction times until gelling occurred.

The organically modified $SiO_2$ aerogels of Examples 1 to 9 were heated to 400° C. at a heating rate of 10° C./min in an argon stream (from 50 to 100 $cm^3$/min)Heating to 1000° C. (Example 8: 500° C.) was then carried out at a heating rate of 1° C./min in a stationary argon atmosphere. The thermal treatment was terminated in Examples 1 to 6 after reaching 1000° C. and in Example 8 after reaching 500° C. The $SiO_2$ aerogel sample was kept at 1000° C. in a $CH_4$ stream of 0.5 $cm^3$/min for a further 3 hours in Example 7 and for 1 hour in Example 9.

The organically modified $SiO_2$ aerogels were characterized before and after carrying out the novel process.

The content of organic carbon which is present in the form of R and RO groups was determined in the organically modified $SiO_2$ aerogels before carrying out the novel process but after the supercritical drying with methanol. After the novel process had been carried out, the content of elemental carbon was determined. The determinations were effected in each case by elemental analysis.

In addition, the shrinkage due to the pyrolysis was determined for the $SiO_2$ aerogel samples. For this purpose, the percentage decrease in the diameter of cylindrical $SiO_2$ aerogel samples was determined.

The densities (in $kg/m^3$) and the specific surface area (in $m^2/g$, measured according to the BET method) were measured for the $SiO_2$ aerogel samples before the pyrolysis (after the supercritical drying) and after the pyrolysis.

Furthermore, the specific absorbance (in $m^{2/kg}$) at 3, 5 and 10 µm was determined by IR spectroscopy for the pyrolyzed $SiO_2$ aerogel samples.

Data for the preparation and characterization of the organically modified $SiO_2$ aerogels are shown in Table 1 and data for the characterization of the pyrolyzed $SiO_2$ aerogels in Table 2.

The thermal conductivity λ of the pyrolyzed $SiO_2$ aerogel samples of Examples 8 and 9 was measured in each case by the hot wire method.

In the hot wire method, a thin wire (for example of platinum) is supplied, from a certain time, with an electric power which is constant as a function of time. This results in heating of the wire, the wire heating up more slowly in media having high thermal conductivity than in those having a low thermal conductivity. The extent of heating of the wire and hence indirectly the thermal conductivity of the medium surrounding the wire can then be determined via the resistance of the wire, which increases with increasing temperature (cf. H.-P. Ebert, V. Bock, O. Nilsson and J. Fricke, The Hot-Wire Method applied to porous materials with low thermal conductivity, 13th European Conference on Thermophysical Properties, Lisbon, Portugal, August/September, 1993, accepted for publication in High Temperatures—High Pressures; and DIN 51046, Part 1).

By means of the hot wire method at 300 K under air at atmospheric pressure, a conductivity of 0.012 W/m K was determined for the sample from Example 8 and a conductivity of the 0.015 W/m K for the sample from Example 9.

TABLE 1

Preparation and characterization of the organically modified $SiO_2$ aerogels

| Example | R | $RSi(OMe)_3$ g (mmol) | $Si(OMe)_4$ g (mmol) | MeOH g | 0.01 N $NH_3$ aq. g | Reaction time to gelling, min | Density $kg/m^3$ | Carbon content mmol/100 g | Specific surface area $m^2/g$ |
|---|---|---|---|---|---|---|---|---|---|
| 1 | — | — | 50.72(333) | 21.14 | 23.99 | 20 | 267 | 444 | 469 |
| 2 | Methyl | 8.99 (66) | 40.19(264) | 21.20 | 22.57 | 25 | 256 | 615 | 566 |
| 3 | Methyl | 18.12(133) | 30.44(200) | 22.44 | 21.58 | 30 | 210 | 818 | 610 |
| 4 | Vinyl | 9.78(66) | 40.19(264) | 22.38 | 22.57 | 55 | 267 | 832 | 590 |
| 5 | Propyl | 10.84(66) | 40.19(264) | 21.24 | 22.57 | 90 | 230 | 885 | 505 |
| 6 | Phenyl | 13.09(66) | 40.19(264) | 20.63 | 22.57 | >90 | 288 | 1605 | 450 |
| 7 | | | | (Identical to Example 2) | | | | | |
| 8 | Methyl | 20.44(150) | 91.34(600) | 109.50 | 51.30 | 90 | — | 375 | — |
| 9 | Phenyl | 19.83(100) | 60.88(400) | 148.65 | 34.20 | 360 | — | — | — |

TABLE 2

Characterization of the novel $SiO_2$ aerogels

| Example | Density $kg/m^3$ | Carbon content mmol/100 g | Spec. surface area $m^2/g$ | Shrinkage % | Specific absorbance $m^2/kg$ 3 μm | 5 μm | 10 μm |
|---|---|---|---|---|---|---|---|
| 1 | 281 | 160 | 412 | 5.4 | 1 | 1 | 1 |
| 2 | 276 | 216 | 444 | 6.6 | 8 | 10 | 100 |
| 3 | 239 | 515 | 394 | 11.7 | 12 | 10 | 100 |
| 4 | 395 | 310 | 403 | 37.4 | 40 | 20 | 100 |
| 5 | 274 | 750 | 331 | 18.1 | 15 | 10 | 100 |
| 6 | 340 | 1218 | 320 | 14.3 | 60 | 40 | 100 |
| 7 | n.d. | 2323 | 487 | n.d. | 800 | 800 | 800 |
| 8 | 170 | 375 | — | — | 5 | 4 | 100 |
| 9 | 178 | — | — | 12 | — | — | — | n.d. = not determined

We claim:

1. An $SiO_2$ aerogel having a density of up to 395 $kg/m^3$ and containing carbon particles, which aerogel is obtained by heating
   a) organically modified $SiO_2$ aerogels having a density of up to 395 $kg/m^3$ in the presence of at least one pyrolyzable hydrocarbon gas or at least one inert gas or
   b) organically unmodified $SiO_2$ aerogels having a density of up to 395 $kg/m^3$ in the presence of at least one pyrolyzable hydrocarbon gas and in the presence or absence of inert gases
to 600°–1300° C.

2. An $SiO_2$ aerogel containing carbon particles, having a density of less than 250 $kg/m^3$ and obtained by heating
   a) organically modified $SiO_2$ aerogels having a density of less than 250 $kg/m^3$ in the presence of at least one pyrolyzable hydrocarbon gas and/or at least one inert gas or
   b) organically unmodified $SiO_2$ aerogels having a density of less than 250 $kg/m^3$ in the presence of at least one pyrolyzable hydrocarbon gas and in the presence or absence of inert gases
to 350°–700° C.

3. A process for the production of carbon particles in $SiO_2$ aerogels, wherein
   a) organically modified $SiO_2$ aerogels having a density of up to 395 $kg/m^3$ are heated in the presence of at least one pyrolyzable hydrocarbon gas or at least one inert gas or
   b) organically unmodified $SiO_2$ aerogels having a density of up to 395 $kg/m^3$ are heated in the presence of at least one pyrolyzable hydrocarbon gas and in the presence or absence of inert gases
to 600°–1300° C.

4. A process as defined in claim 3, wherein organically modified $SiO_2$ aerogels are used which contain organic radicals R selected from the group consisting of alkyl, alkenyl, alkynyl and aryl, some or all of said radicals being bonded directly to the silicon atom.

5. A process as defined in claims 4, wherein the organic radical is aryl or alkyl.

6. A process for the production of carbon particles in $SiO_2$ aerogels having a density of less than 250 $kg/m^3$, which comprises heating to 350°–700° C.
   a) organically modified $SiO_2$ aerogels having a density of less than 250 $kg/m^3$ in the presence of at least one pyrolyzable hydrocarbon gas and/or at least one inert gas or
   b) organically unmodified $SiO_2$ aerogels having a density of less than 250 $kg/m^3$ in the presence of at least one pyrolyzable hydrocarbon gas and in the presence or absence of inert gases.

* * * * *